United States Patent
Kniess et al.

(10) Patent No.: US 6,291,551 B1
(45) Date of Patent: Sep. 18, 2001

(54) LASER-MARKABLE PLASTICS

(75) Inventors: Helge Kniess, Weiterstadt; Dieter Heinz, Heppenheim; Reiner Delp, Darmstadt; Gerhard Pfaff, Münster; Matthias Kuntz, Seeheim-Jugenheim, all of (DE)

(73) Assignee: Merck Patent Gesellschaft mit Beschrankter Haftung (DE)

( * ) Notice: Subject to any disclaimer, the term of this patent is extended or adjusted under 35 U.S.C. 154(b) by 0 days.

(21) Appl. No.: 09/661,324

(22) Filed: Sep. 13, 2000

(30) Foreign Application Priority Data

Sep. 13, 1999 (DE) .............................. 199 43 648

(51) Int. Cl.⁷ .............. C08K 9/04; C08K 5/01; C08K 5/053; C09D 5/29; G03C 1/72
(52) U.S. Cl. ............ 523/216; 523/205; 523/171; 523/217; 524/387; 524/449; 524/486; 430/270.1; 430/338; 430/945
(58) Field of Search ...................... 523/171, 205, 523/216, 217; 524/486, 387, 449; 430/270.1, 338, 945

(56) References Cited

U.S. PATENT DOCUMENTS 5,576,377 * 11/1996 Sayed et al. .
5,599,869 * 2/1997 Kurz .
5,866,644 * 4/1999 Merox et al. .
6,207,344 * 3/2001 Ramlow et al. .

* cited by examiner

*Primary Examiner*—Tae H. Yoon
(74) *Attorney, Agent, or Firm*—Millen, White, Zelando & Branigan, P.C.

(57) ABSTRACT

The present invention relates to laser-markable plastics of which a feature is that they comprise as dopant anthracene- or pentaerythritol-coated effect pigments or a mixture comprising one or more effect pigments and anthracene and/or pentaerythritol.

10 Claims, No Drawings

LASER-MARKABLE PLASTICS

The present invention relates to laser-markable plastics comprising as a dopant anthracene- and/or pentaerythritol-coated effect pigments or a mixture comprising one or more effect pigments and anthracene and/or pentaerythritol.

BACKGROUND OF THE INVENTION

The identity marking of production goods is becoming increasingly important across almost all sectors of industry. For example, it is frequently necessary to apply production dates, expiry dates, bar codes, company logos, serial numbers, etc., to plastics or polymer films. At the present time, these marks are made predominantly using conventional techniques such as printing, embossing, stamping and labelling. Growing importance is being acquired, however, by contactless, high-speed and flexible marking using lasers, especially in the case of plastics. This technique makes it possible to apply graphic inscriptions, for example bar codes, at high speed even to a non-planar surface. Since the inscription is within the plastics article itself, it is durably abrasion-resistant.

Many plastics, such as polyolefins and polystyrenes, for example, have hitherto proved to be very difficult or even impossible to mark by means of the laser. A $CO_2$ laser which emits light in the infrared region at 10.6 m produces only a faint, barely legible mark on polyolefins and polystyrenes even at very high output levels. In the case of the elastomers polyurethane and polyether esters, there is no interaction with Nd-YAG lasers whereas with $CO_2$ lasers engraving occurs. The plastic must not completely reflect or transmit the laser light, since if it did so there would be no interaction. However, there must also not be strong absorption, since in that case the plastic would evaporate to leave only an engraving. The absorption of the laser beams, and hence the interaction with the material, is dependent on the chemical structure of the plastic and on the laser wavelength employed. In many cases it is necessary to add appropriate additives, such as absorbers, in order to render plastics laser-inscribable.

For the laser identity marking of plastics, use is increasingly being made, besides $CO_2$ lasers, of Nd:YAG lasers. The YAG lasers commonly used emit a pulsed energy beam having a characteristic wavelength of 1064 nm or 532 nm. The absorber material must exhibit pronounced absorption within this specific NIR range in order to show a sufficient reaction in the rapid inscription processes.

The laser marking of plastics with pearl luster pigments was first described in Speciality Chemicals, Pearl Lustre Pigments—Characteristics and Functional Effects—May 1982.

The use of organic additives as dopants in laser marking is known, for example, from WO 95/30716, DE 195 360 47 A1, US 5,576,377 and DE 197 26 136 A1.

The prior art dopants all, however, possess the disadvantage that they persistently color the plastic that is to be inscribed, as a consequence of which the laser inscription, which is normally a dark script on a light background, lacks a sufficient contrast. Moreover, they have to be added in comparatively high concentrations, and in many cases are toxicologically objectionable.

SUMMARY OF THE INVENTION

An object of the present invention, therefore, was to provide laser-markable plastics which permit high-contrast marking under the action of laser light. The filler, or the successful absorption agent, should therefore possess a very light intrinsic color or should need to be used only in very small amounts.

It has surprisingly been found that the laser markability of plastics, and in particular the contrast of the marking, may be improved by coating effect pigments with anthracene and/or pentaerythritol or using a mixture of effect pigments and these organic additives.

Effect pigments are pigments which show in formulations like lacquers, printing inks, plastics and cosmetic formulations an optical effect based on light reflection phenonema. Effect pigments are for example metal effect pigments and pearlescent pigments, platelet-shaped iron oxide and platelet-shaped graphite. See, e.g., Römpp Chemie Lexikon, George Thieme Verlag, 1998, pp. 176, 378 and 438.

Through the addition of the coated effect pigments in concentrations of preferably about 0.5 to 10% by weight based on the plastics system, more preferably 1 to 5% by weight, and in particular 1.5 to 3% by weight, a high contrast is achieved in the laser marking of thermoplastics.

If a mixture of effect pigments and anthracene or effect pigments and pentaerythritol is used, then the overall concentration of the dopant in the plastic is preferably not more than 10% by weight. More preferably it is 1 to 5% by weight, in particular 1.5 to 3% by weight. ("Dopant refers to a mixture of pigment and anthracene or pentaerythritol or a pearlescent pigment coated with anthracene or pentaerythritol.

The mixing ratio of effect pigment to anthracene or effect pigment to pentaerythritol is preferably about 1:4 to 10:1, more preferably 1:3 to 5:1, in particular 1:2 to 2:1.

The concentration of the dopant in the plastic is, however, dependent on the plastics system used. The small fraction of effect pigment and anthracene and/or pentaerythritol does not substantially alter the plastics system and does not affect its ability to be processed.

Transparent thermoplastics comprising the aforementioned dopants in straight coloring exhibit a slightly metallic glimmer but retain their transparency. This metallic gleam, especially in the case of polyolefins, can be completely masked if required by the addition of preferably about 0.2 to 10% by weight, more preferably 0.5 to 3% by weight, of hiding pigments, such as titanium dioxide, for example. Furthermore, colorants may be added to the plastics, permitting color variations of any kind and at the same time ensuring retention of the laser marking. Appropriate colorants include, in particular, colored metal oxide pigments and also organic pigments and dyes.

The effect pigments suitable for marking are based preferably on platelet-shaped substrates, preferably transparent or semitransparent substrates comprising, for example phyllosilicates, such as synthetic or natural mica, talc, kaolin, glass flakes, $Sio_2$ platelets or synthetic unsupported platelets. Also suitable are platelet-shaped metal oxides such as platelet-shaped iron oxide, aluminium oxide, titanium dioxide, silicon dioxide, LCPs (liquid crystal polymers), holographic pigments, coated graphite platelets, or bismuth oxychloride.

As platelet-shaped pigments it is also possible to use metal flakes, which may be uncoated or else covered with one or more metal oxide layers; preference is given, for example, to Al, Cr, Fe, Au, Ag and steel flakes. If corrosion-susceptible metal flakes such as Al, Fe or steel flakes are to be used uncoated, they are preferably covered with a protective polymer layer.

Particularly preferred substrates are mica flakes coated with one or more metal oxides. Metal oxides used in this case include both colorless metal oxides of high refractive index, such as especially titanium dioxide, zinc oxide, tin oxide and/or zirconium dioxide, and colored metal oxides such as chromium oxide, nickel oxide, copper oxide, cobalt oxide and especially iron oxide ($Fe_2O_3$, $Fe_3O_4$), for example.

These platelet-shaped pigments are known and to a very large extent are available commercially, for example under the brand name Iriodin® from Merck KGaA, and/or may be prepared by standard methods known to the person skilled in the art. Pearl luster pigments based on transparent or semi-transparent platelet-shaped substrates, for example, are described in the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and 38 42 330.

Coated $SiO_2$ platelets are known, for example, from WO 93/08237 (wet-chemical coating) and DE-A 196 14 637 (CVD technique).

Particularly suitable are pearl luster pigments in combination with pentaerythritol and/or anthracene. The pearl luster pigments may in this case be present as a mixture with pentaerythritol and/or anthracene or may be coated with the organic additive.

The application of the anthracene or pentaerythritol coat to the pearl luster pigment takes place in a conventional manner. Coating may be effected, for example, by dissolving pentaerythritol in water at room temperature, adding one or more effect pigments to the solution and mixing the mixture homogeneously. This suspension is then heated to boiling and boiled down to give the residue. The product is dried at 110° C.

Furthermore, coating may be effected by stirring anthracene in an organic solvent, such as diethyl ether, for example, initially at room temperature, and then heating it to boiling temperature, with the anthracene dissolving. Following the addition of one or more effect pigments, the suspension is boiled under reflux. Finally, the solvent is distilled off and the product is dried.

Also possible is coating by suspending pentaerythritol in water, and heating the suspension to boiling, with the pentaerythritol dissolving. Following the addition of one or more effect pigments, the mixture is heated and boiled under reflux. Finally, the suspension is filtered with suction while still hot and the product is dried.

Yet another possibility is to prepare a mechanical mixture of one or more effect pigments and comminuted pentaerythritol.

The thickness of the anthracene or pentaerythritol coat is preferably about 50 to 2000 nm, more preferably 100 to 1000 nm, in particular 200 to 800 nm. The fraction of anthracene or pentaerythritol based on the overall pigment is preferably 1 to 75% by weight, in particular 1 to 65% by weight.

Pigments particularly suitable for laser marking are pearl luster pigments based on mica, glass flakes or $SiO_2$ platelets which are first of all coated with one or more metal oxides (multilayer pigments) and finally with anthracene or pentaerythritol. Similar suitability is possessed, however, by mixtures of metal-oxide-coated substrate platelets such as mica, glass or $SiO_2$ with anthracene or pentaerythritol.

Preferred dopants are anthracene- or pentaerythritol-coated pearl luster pigments possessing the following layer structure:

Anthracene or pentaerythritol
Metal oxide (e.g. $TiO_2$)
Mica
Metal oxide (e.g. $TiO_2$)
Anthracene or pentaerythritol, although other layer structures operable in the invention would be understood by one of ordinary skill in the art as easily produceable by standard variations of the foregoing techniques.

All known thermoplastics as described, for example, in Ullmann, Vol. 15, p. 457 ff., Verlag VCH, may be employed for laser marking. Examples of suitable plastics are polyethylene, polypropylene, polyamides, polyesters, polyester esters, polyether esters, polyphenylene ethers, polyacetal, polybutylene terephthalate, polymethyl methacrylate, polyvinyl acetal, polystyrene, acrylonitrile-butadiene-styrene (ABS), acrylonitrile-styrene-acrylate (ASA), polycarbonate, polyether sulfones and polyether ketones, and also their copolymers and/or mixture.

The incorporation of the coated effect pigments or of the mixture of anthracene or pentaerythritol in combination with one or more effect pigments into the thermoplastic takes place, e.g., by mixing the plastics granules with the dopant and then shaping the mixture under the action of heat. Other conventional mixing techniques would be known to one of ordinary skill in the art. The addition of the anthracene and/or of the pentaerythritol and of the effect pigment to the plastic may take place simultaneously or in succession. During the incorporation of the dopant, tackifiers, organic polymer-compatible solvents, stabilizers and/or surfactants which are temperature-stable under the operating conditions may be added to the plastics granules. The doped plastics granules are generally prepared by introducing the plastics granules into an appropriate mixer, wetting them with any additives, and then adding the dopant and mixing it in. The plastic is generally pigmented by way of a color concentrate (masterbatch) or compound. The mixture obtained in this way may then be processed directly in an extruder or an injection molding machine. The moldings formed in the course of the processing exhibit a very homogeneous distribution of the dopant.

Subsequently, laser marking takes place with an appropriate laser, according to conventional techniques.

The invention additionally provides a process for producing the laser-markable plastics of the invention, characterized in that a thermoplastic is mixed with the dopant and then shaped under the action of heat.

Inscription with the laser is carried out by introducing the sample structure into the beam path of a pulsed laser, preferably an Nd:YAG laser. Inscription with an excimer laser, via a mask technique, for example, is a further possibility. However, the desired results may also be achieved with other conventional laser types featuring a wavelength in a range of high absorption of the pigment used. The marking obtained is determined by the exposure time (or pulse count in the case of pulsed lasers) and irradiation output of the laser and by the plastics system used. The output of the lasers used depends on the particular application and may be determined readily in each individual case by the person skilled in the art.

The laser employed generally has a wavelength in the range from 157 nm to 10.6 m, preferably in the range from 532 nm to 10.6 m. Mention may be made here, for example, of $CO_2$ lasers (10.6 m and Nd:YAG lasers (1064 or 532 nm) or pulsed UV lasers. The excimer lasers have the following wavelengths: $F_2$ excimer lasers (157 nm), ArF excimer lasers (193 nm), KrCl excimer lasers (222 nm), KrF excimer lasers (248 nm), XeCl excimer lasers (308 nm), XeF excimer layers (351 nm), frequency-multiplied Nd:YAG lasers having wavelengths of 355 nm (frequency-tripled) or 265 nm (frequency-quadrupled).

Particular preference is given to the use of Nd:YAG lasers (1064 or 532 nm) and $CO_2$ lasers. The energy densities of the lasers used are generally situated within the range from 0.3 $mJ/cm^2$ to 50 $J/cm^2$, preferably from 0.3 $mJ/cm^2$ to 10 $J/cm^2$.

In the case of the use of pulsed lasers, the pulse frequency is generally situated within the range from 1 to 30 kHz.

Corresponding lasers which may be used in the process of the invention are available commercially.

The plastic pigmented in accordance with the invention may be used in all fields where customary printing processes have hitherto been employed for the inscription of plastics. For example, moldings of the plastic of the invention may be used in the electrical, electronics and motor vehicle industries. The identity marking and inscription of, for example, cables, lines, trim strips and functional components in the heating, ventilation and cooling sectors, or switches, plugs, levers and handles, comprising the plastic of the invention, may be marked with the aid of laser light, even at difficult-to-reach points. Furthermore, the plastics system of the invention may be used for packaging in the food sector or in the toy sector. The markings on the packaging are notable for their resistance to wiping and scratching, for their stability during subsequent sterilization processes, and for the fact that they can be applied in a hygienically pure manner in the marking process. Complete label motifs may be applied durably to the packaging for a reusable system. Another important area of application for laser inscription is that of plastic tags for the individual identity marking of animals, known as cattle tags or earmarks. By means of a bar code system, the information pertaining specifically to the animal is stored. On demand, this information can be called up again using a scanner. The inscription must be extremely durable, since the mark will remain on the animals for in some cases several years.

The laser marking of plastics articles or moldings comprising the plastic of the invention is hence possible.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above, and of corresponding German application No. 199 43 648.7, filed Sep. 13, 1999, is hereby incorporated by reference.

EXAMPLES

Example 1
Dopant: Anthracene-coated Pearl Luster Pigment
a) Coating of a Pearl Luster Pigment with Anthracene
1 g of anthracene is introduced with 200 ml of diethyl ether, stirred at room temperature for 1 h and then heated to boiling. Then 10 g of Iriodin® 110 ($TiO_2$-coated mica pigment from Merck KGaA, Darmstadt, Germany) are added and the mixture is boiled under reflux for ½ h. Subsequently, the diethyl ether is distilled off, DI water is added, the mixture is filtered with suction and the solid product is washed with DI water. The coated pigment is filtered off hot with suction, and dried.

b) Laser Marking
PP granules (PP-HD, Stamylen PPH 10 from DSM) are processed by injection molding with the addition of 0.5% of the pigment from Example 1a). The resultant molding (plaque) is subsequently inscribed with a $CO_2$ laser. The inscription becomes darker and darker as the energy density (approximately 12 $J/cm^2$) increases.

Example 2
Dopant: Pentaerythritol-coated Pearl Luster Pigment
10 g of pentaerythritol are dissolved in 250 ml of DI water with stirring at room temperature, 20 g of Iriodin® 110 are added, and the mixture is stirred for 30 minutes. The suspension is subsequently heated to boiling and stirred until the total volume has reduced to approximately 50 ml. The product is dried at 100° C. for 12 h.

Example 3
Dopant: Anthracene-coated Pearl Luster Pigment+Color Pigment
In analogy to Examples 1a) and b), but the PP granules are pigmented with 0.5% of the prepared pigment from Example 1a) and 0.1% PV Echtblau (Hoechst AG) and processed on an injection molding machine.

Example 4
Dopant: Pearl Luster Pigment+Anthracene
1 g of anthracene is mixed with 10 g of LS 820 (antimony-doped tin oxide on mica from Merck KGaA, Darmstadt, Germany).
PP granules (PP-HD, Stamylen PPH 10 from DSM) are processed by injection molding with the addition of 0.5% of the above pigment. Following inscription with an Nd:YAG laser at a current strength of 14 A, a pulse frequency of 5 kHz and a writing speed of 200 mm/s, the plaques exhibit a high-contrast abrasion-resistant inscription.

Example 5
Dopant: Pearl Luster Pigment+Pentaerythritol
1 g of pentaerythritol is mixed with 10 g of LS 820 (antimony-doped tin oxide on mica from Merck KGaA, Darmstadt, Germany).
PP granules (PP-HD, Stamylen PPH 10 from DSM) are processed by injection molding with the addition of 0.5% of the above pigment. Following inscription with an Nd:YAG laser at a current strength of 14 A, a pulse frequency of 5 kHz and a writing speed of 200 mm/s, the plaques exhibit a high-contrast abrasion-resistant inscription.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A laser-markable plastic, comprising a thermoplastic and a dopant, which dopant is an anthracene- and/or pentaerythritol-coated effect pigment or a mixture comprising at least one effect pigment and anthracene and/or pentaerythritol.

2. A laser-markable plastic according to claim 1, wherein the effect pigment is a pearl luster pigment.

3. A laser-markable plastic according to claim 2, wherein the effect pigment comprises a pearl luster pigments based on mica platelets, $SiO_2$ platelets or glass flakes.

4. A laser-markable plastic according claim 2, wherein the pearl luster pigment is a $TiO_2$-coated mica pigment.

5. A laser-markable plastic according to claim 1, wherein the dopant is present in an amount of 0.5 to 10% by weight, based on the plastic system.

6. A laser-markable plastic according to claim 1, wherein the anthracene or pentaerythritol coat on the effect pigment is present in an amount of 1 to 75% by weight, based on the overall pigment.

7. A laser-markable plastic according to claim 1, wherein the plastic is a polyethylene, polypropylene, polyamide or a polyester.

8. A laser-markable plastic according to claim 1, further comprising at least one color pigment.

9. A process for producing a laser-markable plastic according to claim 1, comprising mixing at least one thermoplastic with at least one anthracene- and/or pentaerythritol-coated effect pigment or with a mixture of at least one effect pigment and anthracene and/or pentaerythritol, and shaping the mixture under the action of heat.

10. A molded thermoplastic markable with laser radiation, comprising a laser-markable plastic according to claim 1.

* * * * *